United States Patent [19]

Ulrich et al.

[11] 3,862,726

[45] Jan. 28, 1975

[54] SAFETY BELT DEVICE

[75] Inventors: Charles J. Ulrich, Montecito; Akira Tanaka, Northridge, both of Calif.

[73] Assignee: American Safety Equipment Corporation, New York, N.Y.

[22] Filed: July 16, 1973

[21] Appl. No.: 379,710

[52] U.S. Cl. .................. 242/107.4, 242/107 SB
[51] Int. Cl. ............................................ A62b 35/00
[58] Field of Search ........ 242/107.4, 107 SB, 107.3; 297/386, 388; 280/150 SB

[56] References Cited
UNITED STATES PATENTS

| | | | |
|---|---|---|---|
| 3,450,368 | 6/1969 | Glauser et al. | 242/107.4 |
| 3,632,056 | 1/1972 | Hibbard et al. | 242/107.4 |
| 3,741,496 | 6/1973 | Beller | 242/107.4 |

*Primary Examiner*—Edward J. McCarthy
*Attorney, Agent, or Firm*—Miketta, Glenny, Poms & Smith

[57] ABSTRACT

A safety belt device having a frame and a shaft journaled for rotation in the frame. A spool is rotatably mounted on the shaft and a strap is secured to the shaft and adapted to be wound onto the spool. A rewind spring is operatively connected to both the frame and the shaft for rewinding the strap back onto the spool when it is extended out of the frame. A tooth gear is also mounted on the shaft and rotatable therewith. A lock bar is mounted on the frame and has a locking pawl adapted to engage the gear to lock the gear and thus the shaft from rotation. Inertia responsive means are provided responsive to sudden acceleration of the strap off of the spool to move the pawl into locking engagement. Strap state sensing means are also provided to sense the rolled-up condition of the strap on the spool and hold the pawl out of locking engagement with the gear until a predetermined amount of strap is unrolled off of the spool. Blocking means are also provided for holding the pawl out of engagement with the gear while the strap is being unwound from the spool and releasing the pawl for locking engagement with the gear when a predetermined amount of strap is wound back onto the spool by the rewind spring. In this manner, the strap can be freely pulled from the spool, and the lock bar, which is normally biased into locking engagement with the gear, is only released for such engagement means upon actuation of the inertia response means and after the blocking means is unblocked and the strap sensing means is disengaged. Accidental acceleration of the strap or belt by the user when extending the same from the reel cannot lock the reel prematurely.

6 Claims, 15 Drawing Figures

SAFETY BELT DEVICE

BACKGROUND OF THE INVENTION

1. Field of the Invention

The invention relates to improvements in safety belt devices, and, more particularly, to self-retracting safety belts for use on vehicles or the like.

2. Description of the Prior Art

Safety belt devices of the type disclosed herein have been developed over the years for use in aircraft, automobiles, and similar vehicles or the like. These devices generally combine a frame or casing having a spindle-supported reel thereon with a belt or strap automatically wound thereon and unwound therefrom in response to movements of the user. Such reels normally include a rewind spring to wind the belt or strap back onto the reel and cooperating locking means acting to lock the reel against rotation in case the strap, and hence the user, moves with respect to his seat at an excessive and dangerous acceleration.

However, it is desirable on such devices to make the reel be "free spooling," i.e., the belt or strap cannot accidentally lock up due to excessive acceleration by the user prior to lockup, until placed in a condition of normal use for locking upon a predetermined strap or belt acceleration. Certain prior art devices that attempted to accomplish this normally included inertia actuated means connected to a locking pawl that moved such pawls into locking engagement with a tooth gear or the like upon such acceleration of the belt or strap off of the spool. However, the pawls of such devices were normally in an unlocked position and a positive engagement had to be made to physically move then into locking position. Such physical means could wear and fail during use and must be properly aligned to carry out the locking function. Further, the strap or belt must be able to be freely pulled off of the spool prior to such locking engagement. Known devices have proven unsatisfactory and relatively complex or complicated in structure.

SUMMARY OF THE INVENTION

It is an object of this invention to provide a safety belt device whereby the belt or strap may be freely pulled therefrom without the possibility of any accidental lockup of the belt or strap due to a user's accelerating the strap above a predetermined lockup acceleration rate when placing the belt or strap in use.

It is a further object of this invention to provide such a device having a locking pawl which is normally biased into a locked position but blocked therefrom until the belt or strap is extended from the reel and locked by the user in a conventional manner.

These and other objects are preferably accomplished by providing a safety belt device having a frame and a shaft journaled for rotation in the frame. A spool is rotatably mounted on the shaft and a strap is secured to the shaft and adapted to be wound onto the spool. A rewind spring is operatively connected to both the frame and the shaft for rewinding the strap back onto the spool when it is extended out of the frame. A tooth gear is also mounted on the shaft and rotatable therewith. A lock bar is mounted on the frame and has a locking pawl adapted to engage the gear to lock the gear and thus the shaft from rotation. Inertia responsive means are provided responsive to sudden acceleration of the strap off of the spool to move the pawl into locking engagement. Strap state sensing means are also provided to sense the rolled-up condition of the strap on the spool and hold the pawl out of locking engagement with the gear until a predetermined amount of strap is unrolled off the spool. Blocking means are also provided for holding the pawl out of engagement with the gear while the strap is being unwound from the spool and releasing the pawl for locking engagement with the gear when a predetermined amount of strap is wound back onto the spool by the rewind spring. In this manner, the strap can be freely pulled from the spool and the lock bar, which is normally biased into locking engagement with the gear, is only released for such engagement means upon actuation of the inertia response means and after the blocking means is unblocked and the strap sensing means is disengaged. Accidental acceleration by the user while extending the belt or strap from the reel cannot lock the reel prematurely.

DESCRIPTION OF THE PREFERRED EMBODIMENTS

Figure 1:
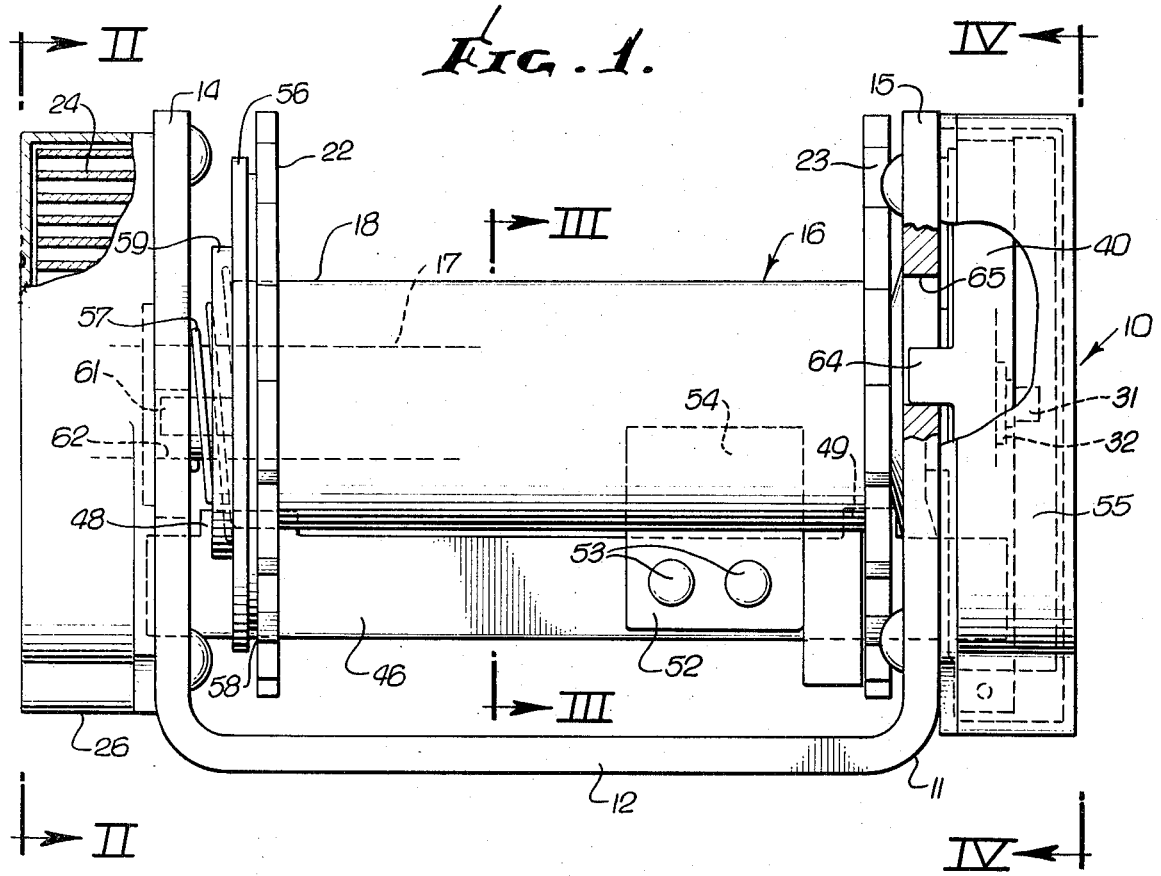
FIG. 1 is a vertical view, partly in section, of the safety belt device in accordance with the invention.

Referring now to FIG. 1 of the drawing, a free pull webbing sensitive retractor assembly 10 in accordance with the invention is shown as comprised of a substantially U-shaped frame 11 having a base 12 that is adapted to be attached by suitable means passing through aperture 13 therein (see FIG. 2) to a seat, frame, or door jamb or the like of a vehicle or the like. The upstanding legs or end walls 14, 15 or frame 11 are provided with aligned bearing apertures for rotatably supporting a reel 16 consisting of a spindle or shaft 17 and a surrounding spool 18, the shaft 17 having its end portions extending through the leg apertures. The hub of spool 18 is of substantially C-shaped cross-section (see FIG. 3) with its inner surface spaced from shaft 17 so as to accommodate the looped end 19 of a webbing or strap 20 which extends out through the opening 21 as is well known in the art. A portion of strap 20 is thus wrapped around the spool hub portion being confined within a guide flange 22, which may have a plurality of ratchet teeth thereon, and a spaced ratchet wheel or tooth gear 23 fixed to the ends of this hub portion (see particularly the dotted lines in FIG. 4). A reel casing (not shown) may be used to enclose reel 16, if desired, which casing would be carried by end walls 14, 15 for enclosing reel 16.

A portion of strap 20 is normally maintained in wrapped condition about spool 18 by means of a spiral spring 24 (see FIG. 2) having its inner end fitted into a slot 25 provided in an end portion of shaft 17. The other end 24' of spring 24 is fixed to a portion on the inner wall of a spring cup 26 as is also well known in the art (see FIG. 2). The spring 24 thus tends to wind the strap 20 upon the spool 18 by turning the reel 16, consisting of shaft 17 and spool 18, within the bearings in end walls 14, 15. The free end portion of strap 20 extends outwardly of the frame 11 for attachment to locking member, not shown, such as a user's shoulder harness or the like.

Figure 6:
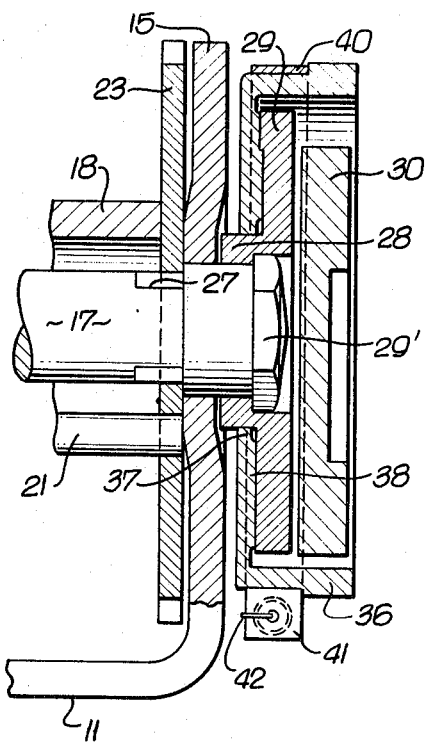
FIG. 6 is a view taken along the lines VI—VI of FIG. 4 with parts thereof omitted for convenience of illustration.

As shown in FIG. 6, the portion of shaft 17 projecting outwardly of end wall 15 is provided with a flat step at 27 fitting into a non-circular hub aperture 28 of a generally circular flange member 29. Flange member 29 is retained in position by screw 29'. In this manner, member 29 turns with shaft 17 when in use. An inertia member 30 in the form of a substantially semicircular plate or dog (see also FIGS. 4 and 5) is turnably mounted on flange member 29 by means of a cylindrical boss 31 on member 29 (see FIG. 4) passing through the center of gravity of inertia member 30. Boss 31 is radially offset from the axis of shaft 17. A washer 32 may be disposed on boss 31 between members 29 and 30.

A coil calibration tension spring 33 has one end thereof connected to an apertured tab 34 on inertia member 30 and has its other end connected to a boss 35 provided on flange member 29 and acts to normally hold inertia member 30 in position with respect to flange member 29. The tension of calibration spring 33 determines the G-setting of the assembly 10.

A circular cup member 36 having a hub portion 37 turnably mounted on the hub of flange member 29 extends radially outwardly and over inertia member 30. The interior cylindrical surface of cup member 36 is provided with ratchet teeth 38 for cooperating with one or more teeth 39 provided on the peripheral surface of inertia member 30. A split annular clutch spring 40 embraces the outer cylindrical surface of cup member 36. The clutch spring 40 includes an integral outwardly extending tab portion 41 having an aperture therein for receiving one end 42 of a spring 43. The other end 44 of spring 43 is secured within a notch 44' formed in end wall 15 as clearly shown in FIGS. 4 and 5. The clutch spring 40 thus resiliently grips the peripheral surface of cup member 36 with a definite predetermined pressure. The clutch spring 40 and cup member 36 constitute a preloaded clutch, whereby the clutch spring 30 tends to turn with cup member 36 but will slip thereon if held against turning by a force exceeding a predetermined amount. Clutch spring 40 also includes a downwardly extending tab 64 fitting in a slot 65 in end wall 15 (see FIG. 1) to provide a stop as will be discussed further hereinbelow.

Figure 4:
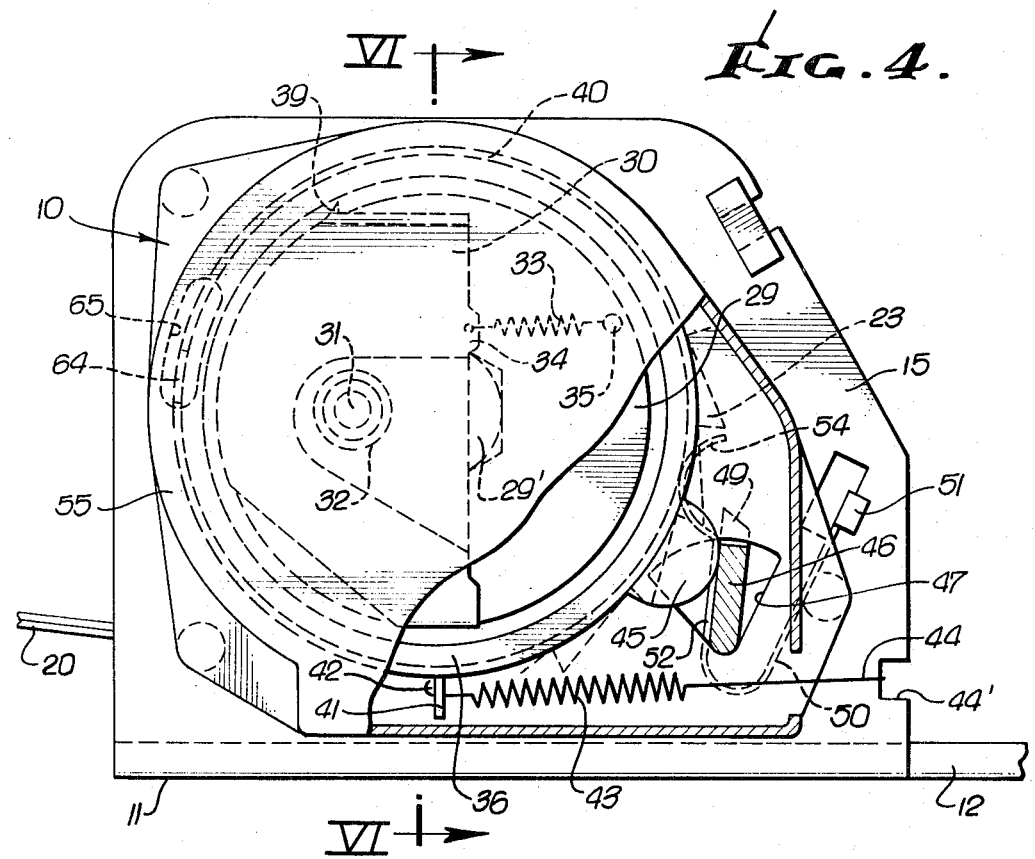
FIG. 4 is a view taken along lines IV—IV of the device of FIG. 1 with parts thereof omitted for convenience of illustration.

As particularly contemplated within the present invention, first pawl blocking means associated with the inertia responsive means are provided for blocking the pawl from engagement with tooth gear 23. In the exemplary embodiment, such first pawl blocking means includes a cam 45 integral with and extending from the periphery of clutch spring 40. In the position of FIG. 4, cam 45 abuts against a lock bar 46. As shown in both FIGS. 1 and 4, lock bar 46 extends transverse of frame 11 and is pivotally supported at its end portions in sector shaped apertures 47 provided in end walls 14, 15. Lock bar 46 has two teeth 48, 49 formed thereon for respectively engaging teeth on flange 22 and tooth gear 23, respectively.

Again, as particularly contemplated within the present invention, second pawl blocking means are provided in the form of a webbing or belt state sensing device. In the exemplary embodiment, such second pawl blocking means comprises a spring member 50 having one end secured within a tie bar 51 mounted on frame 11 which first curves downwardly, then upwardly to a portion 52 fixedly secured as by rivets 53 or the like, to the side of lock bar 46 in engagement with cam 45. Spring member 50 then curves generally semicircularly to form a "bubble" portion 54 (see also FIG. 1). It can be seen by reference to FIG. 4 that when strap or webbing 20 is retracted onto spool 10, bubble portion 54 bears against the outer peripheral surface thereof as shown. Thus, spring membe 50 tends to turn lockbar 46 counterclockwise, as viewed in FIGS. 4 and 5, within its supporting sector apertures 47 in end walls 14, 15 to normally bias teeth 48, 49 into locking engagement with the teeth of flange 22 and gear 23. As shown in FIG. 1, a cover 55 may be provided with snap fasteners or the like for retaining the inertia member 30 and associated parts in position on end wall 15.

Referring once again to FIGS. 1 and 2, as particularly contemplated within the present invention, third pawl blocking means are provided for blocking the lock bar from engagement with gear 23 and flange 22. In the exemplary embodiment, such third pawl blocking means comprises a blocking disc 56 mounted on shaft 17 so as to be freely rotatable thereabout. As shown in FIG. 1, disc 56 is pressed against the outer surface of flange 22 by means of a spring 57 so as to be in frictional contact with flange 22. Contact points 58 or the like may be provided on the surface of disc 56 adapted to engage spaced dimples or the like on the adjacent flange 22 for placing a predetermined amount of friction between the disc and flange 22. Disc 56 includes an integral generally cylindrical member 59 which has one end of spring 57 secured to the inner wall thereof. The other end of spring 57 is secured to end wall 14 (or shaft 17, if desired). Disc 56 also includes an extension portion 60 (see FIG. 2) which includes an integral pin member 61 extending generally normal thereto and movable within a slot 62 in end wall 14.

Figure 7:
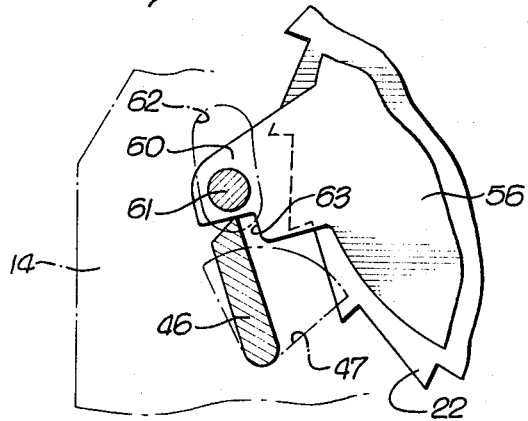
Figure 8:
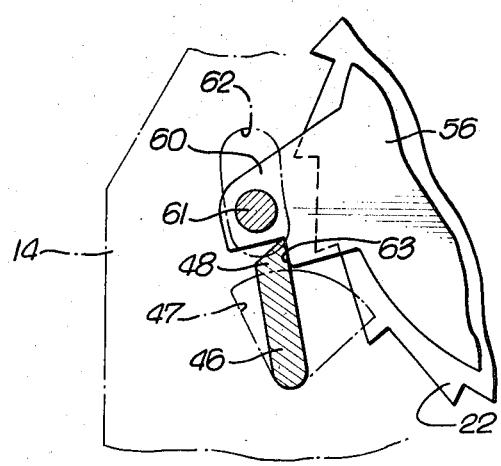

As will be discussed further hereinbelow, in the position of lock bar 46 in FIG. 5, the portion 60 of disc 56 engages lock bar 46 as shown in FIG. 7. As the portion 60 moves up in slot 62 via pin member 61, the lock bar 46 moves to the FIG. 8 position (i.e., abutting against shoulder 63 on nose 60). The complete operation of this mechanism will be discussed further hereinbelow.

Conventional one-way stop means may be provided to be inoperative to prevent protraction of strap 20 from a predetermined retracted condition in which it is partially stowed within the reel housing but rendered inoperative to prevent protraction of the strap 20 after partial retraction thereof. Such means are well known in the seat belt art and forms no particular part of the inventive subject matter of this application. One suitable type of means which can be used is discussed in a United States patent to Replogle, Serial No. 328,8254.

In operation, during normal movements of the user, the strap or webbing 20 is pulled out by the user when he leans forward in his seat, causing spring 24 to yield and unwind the strap 20 from reel 16, the flange member 29 and the inertia member 30 carried thereby turning with the reel 16, and when the user moves back in his seat the spring 24 rewinds strap 20 upon the reel 16.

During the pull-out of strap 20, the cam 45 and lock bar 46 are in the position shown in FIG. 4. Thus, the lock bar 46, normally biased into locking engagement with gear 23 and flange 22, is prevented from such locking by cam 45. The tab 64 of clutch spring 40, which carries cam 45, is disposed within slot 65 as shown in FIG. 4.

Figure 2:
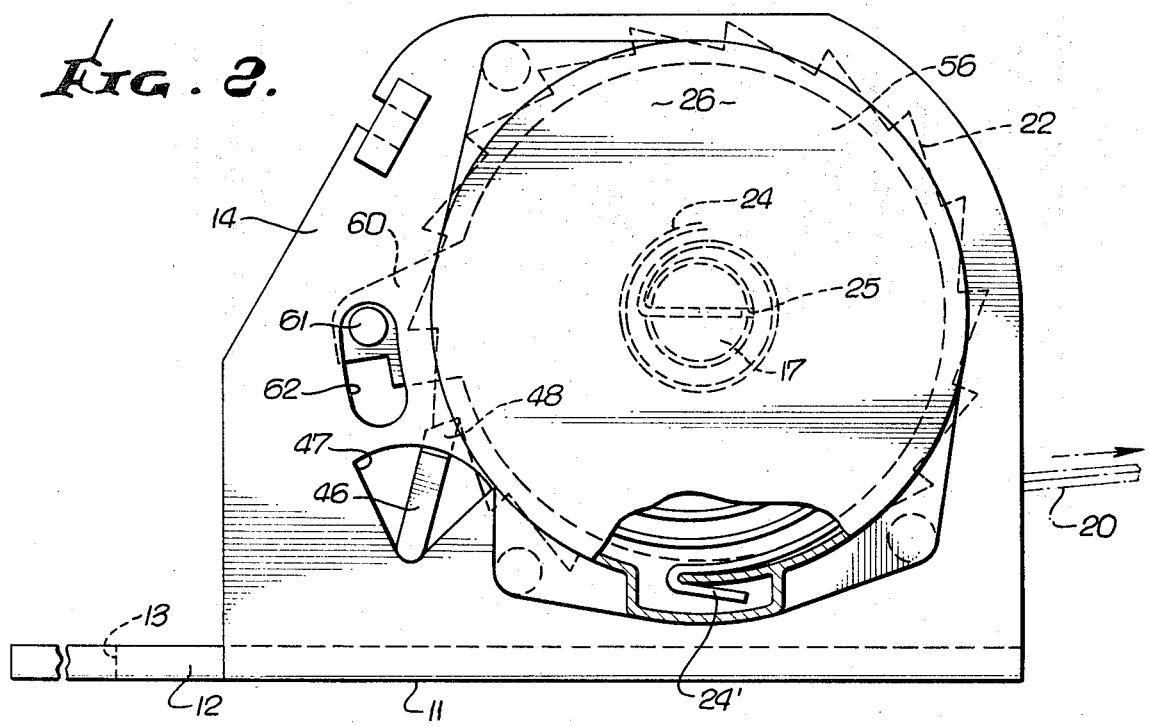
FIG. 2 is a view taken along lines II—II of FIG. 1 with parts omitted for convenience of illustration.
Figure 3:
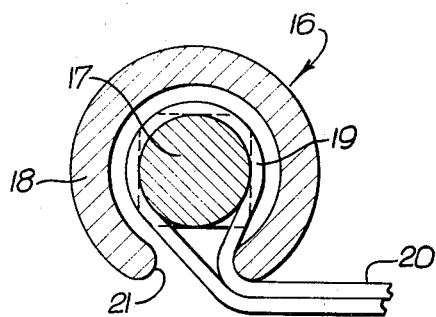
FIG. 3 is a view taken along lines III—III of FIG. 1 with parts thereof omitted for convenience of illustration.

The webbing or strap actuated bubble portion 54 is disposed against the outer surface of the strap 20 also as shown in FIG. 4. In this position, disc 56 in FIG. 2 is in the FIG. 7 position shown with pin 61 at the lower end of slot 62. Lock bar 46 is held in this position by reason of the bubble portion 54 abutting against wound-up portion of strap 20.

As the strap 20 is pulled off of reel 16 in the direction indicated in FIG. 2, the bubble portion 54 moves inwardly with successive unwindings of strap 20 (i.e., in towards the central axis of reel 16 as seen in FIG. 4). The lock bar 46 thus moves toward the FIG. 8 position and into abutting relationship with shoulder 63 on disc 56. Strap 20 may be continued to be pulled off of reel 16 as far as the user desires; the friction drive between flange 22 and disc 56 (since spring 24 urges disc 56 against flange 22) thus also rotates disc 56.

Figure 9:
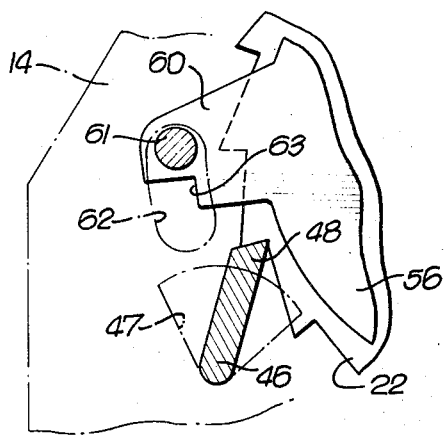
FIGS. 7 through 9 are detailed views showing alternate positions of the lock bar and disc of FIG. 2.

When the uncoiling process is stopped or the free end of strap 20 is locked, the return spring 24 immediately initiates a retracting movement. During the retraction of strap 20 via spring 24, disc 56 is rotated in a direction opposite to the extension of strap 20 from reel 16 since it is taken along due to the frictional contact with flange 22 when it is so rotated. This is however, merely a slight partial rotation of disc 56 which is limited by the upward extent of pin 61 within slot 62. This rotation, however, suffices to release lock bar 46 from engagement with shoulder 63 (i.e., from the position shown in FIG. 8 to the position shown in FIG. 9). Since lock bar 46 is normally biased in a locking position by means of spring member 50, it would normally be free to also engage ratchet wheel 23.

Figure 5:
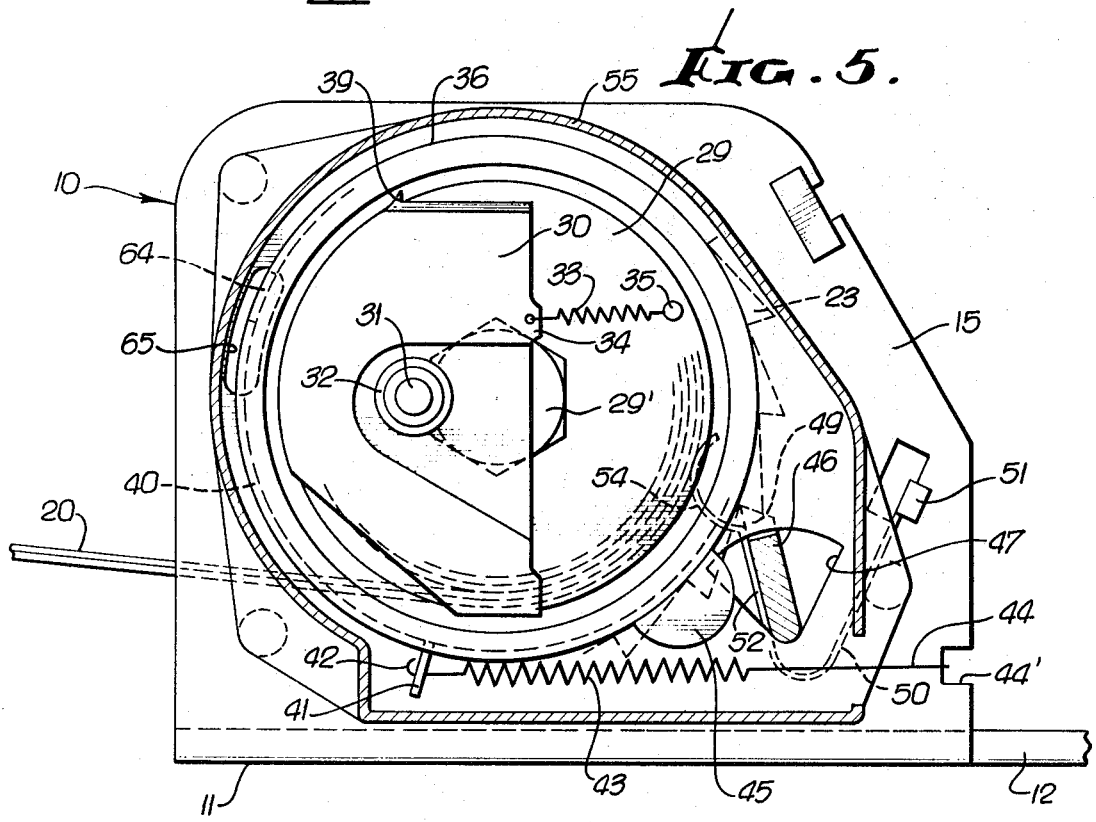
FIG. 5 is a view similar to FIG. 4 showing alternate positions of portions thereof.
Figure 10:
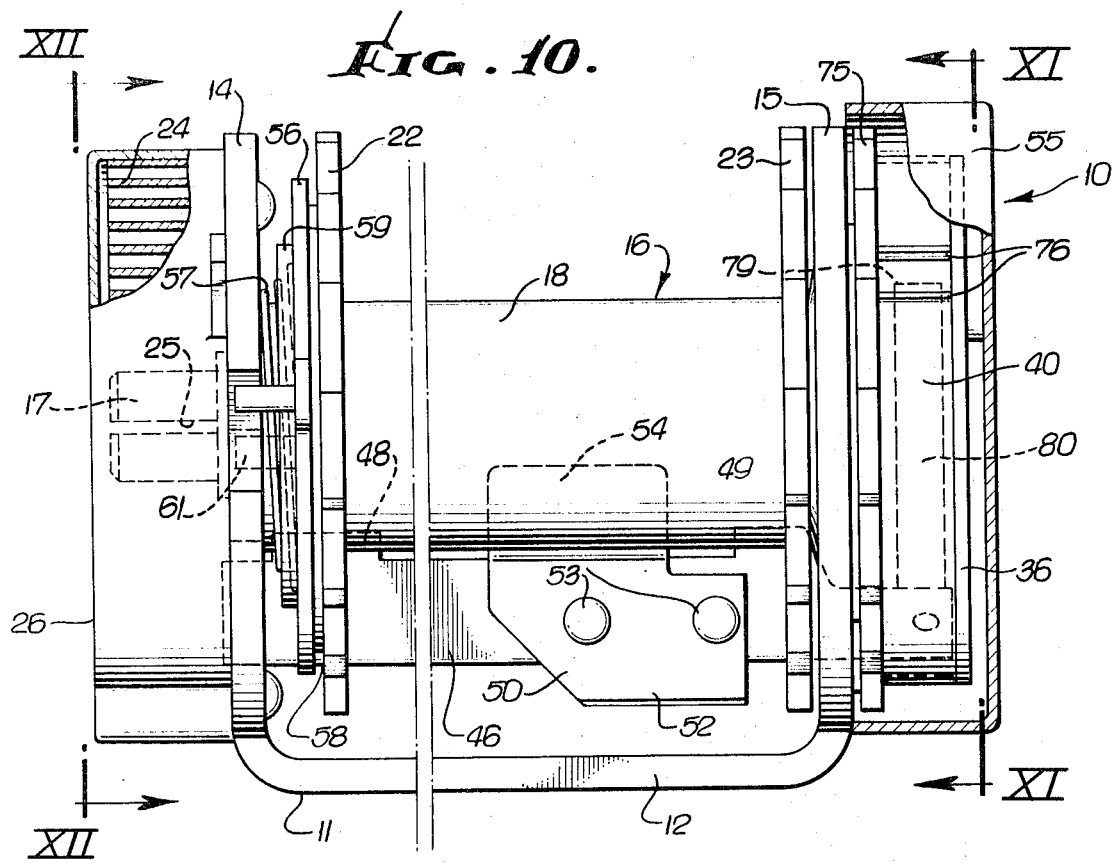
FIG. 10 is a view, similar to FIG. 1, of a modification of the device of FIG. 1.

However, although the spring member 50 is now free to move lock bar 46 to the position shown in FIG. 5, it can be seen that cam 45 of clutch spring 40 retains the lock bar 46 in a manner preventing engagement with wheel 23.

It can therefore be seen that in the event of a crash resulting in a sudden deceleration of the vehicle, the user's body tends to be throuwn forward suddenly so that strap 20 starts to pay out of frame 11 with acceleration. Depending upon the tension of calibration spring 33, if a predetermined dangerous acceleration of the user's body is reached, the inertia member 30 will tend to maintain its original velocity and hence will turn with respect to its pivotal support 31 on flange member 29, thus turning counterclockwise as viewed in FIG. 4 against the tension of spring 33 so that its ratchet tooth 39 engages ratchet teeth 38 on the cup member 36 due to the eccentric mounting of this inertia member with respect to reel shaft 17. Thus, cup member 36 is now caused to turn clockwise within reel 16, and clutch spring 40 turning therewith moves via tab 64 and slot 65 to a position releasing lock bar 46 (i.e., the cam 45 moves to its position shown in FIG. 5). The teeth 48, 49 of lockbar 46 are thus urged by spring member 50 to lock ratchet wheel 23 and flange 22 simultaneously to prevent further pay out of strap 20. With the reel 16 so locked and held firmly at both ends, the shaft 17 is relieved of high torsional loads which otherwise would occur were reel 16 locked at one end only, so that assembly 10 is capable of withstanding enormous strap loads in use.

Once the force on the strap 20 is relieved, then it will retract automatically through the action of the rewind spring 24. As the spring 24 starts to rewind, the flange member 29 will start to turn counterclockwise, as viewed in FIG. 4, causing the tooth 39 of inertia member 30 to disengage the teeth 38 of cup member 36, and spring 33 will turn inertia member 30 back. The return of inertia member 30 will also move clutch spring 40 back to its position in FIG. 4 whereby cam 45 once again abuts against and thereby unlocks lockbar 46, placing reel 16 in condition for another locking operation when required. There is no possibility of assembly 10 locking during windup of strap 20.

In summary, it can be seen from the foregoing that the lock bar 46 is normally biased in a position to lock ratchet wheel 23. Thus, upon actuation of inertia member 30, a positive quick engagement takes place to lock the reel 16 from further paying out of strap 20. Three separate blocking means are used to hold the lockbar 46 in unlocked condition during various stages of use thereof. When the spool 18 is fully wound up, a webbing or strap state sensing means in the form of bubble portion 54 holds the lockbar 46 in unlocked condition. At the same time, the "free-pull" pawl or lockbar blocking disc 56 holds lockbar 46 against locking up during an initial extension of strap 20 when the aforementioned strap state sensing means has become inactive and in spite of inertia locking means attempting to cause lock-up. This inertia locking means employs an inertia responsive weight 30 adapted to engage teeth 38 of a surrounding cup member 36 to cause the latter to turn when a predetermined rate of acceleration of reel 16 is exceeded. A clutch member 40, associated with the inertia weight 30 and cup member 36 has a tab or blocking cam 45 affixed thereto which normally abuts and holds the lockbar 46 in an unlocked condition. When the inertia means locks up due to excessive acceleration of strap 20, clutch member 40 moves cam 45 out of engagement with the lockbar 46 and lockbar 46 is urged by spring member 50 into locking engagement with flange 22 and ratchet wheel 23. There is thus no possibility of accidental lock-up before the belt or strap 20 is payed out due to rapid acceleration by the user.

Although a specific embodiment has been described hereinabove for translating a lock-up between the inertia weight member 30 and its surrounding cup member 36 into a locking motion of lockbar 46, as particularly contemplated within the present invention, such aforementioned first pawl blocking means may be carried out in a different manner. Accordingly, in the embodiment illustrated in FIGS. 10 through 15, such first pawl blocking means may comprise an additional ratchet wheel 75 disposed adjacent end wall 15 (like numerals refer to like parts of FIGS. 1 through 9). The screw 29' (see FIG. 11) threaded into the end of shaft 17 retains wheel 75 in position. Clutch spring 40 includes one or more tabs 76 or the like (see FIG. 11) fitting into one or more notches 77 (see FIG. 11) formed about the periphery of ratchet wheel 75. In this manner, as cup member 36 is rotated (FIG. 13), ratchet wheel 75 is also rotated through shaft 17. When the inertia member 30 is actuated as described hereinabove to lock into engagement with cup member 36, cup member 36 turns ratchet wheel 75 through clutch spring 40.

Figure 13:
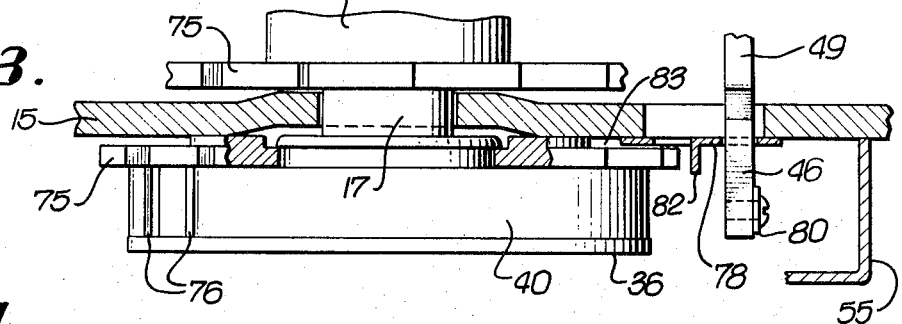
FIG. 13 is a view taken along lines XIII—XIII of FIG. 11.
Figure 14:
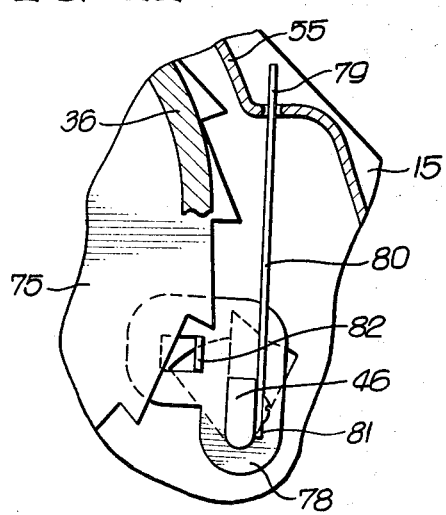
FIGS. 14 and 15 are detailed views showing alternate positions of the lockbar thereof.
Figure 15:
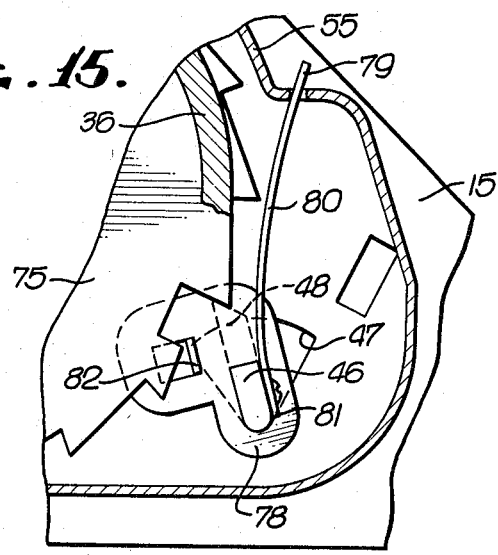

As shown in FIG. 13, pawl bar 46 extends through a dog 78 (see FIGS. 14 and 15) and is securely fixed thereto. An elongated spring 80 is provided having one end 79 fitting into a notch or opening in frame 11 and its opposite end 81 secured to lockbar 46 (see also FIG. 11). Dog 78 also includes an upstanding locking tab or lug 82 to provide a lock-up with ratchet wheel 75. During the free pull of strap 20 from reel 16, dog 78 is in the position of FIG. 11 and movable in a space 83 formed between ratchet wheel 75 and end wall 15 (see FIG. 13).

It can be seen, therefore, that when the aforementioned second and third pawl blocking means are operative, ratchet wheel 75 spins freely without any drag being applied by the clutch mechanism of the inertia lock up means as in the FIGS. 1 through 9 embodiment. However, when the aforementioned second and third pawl blocking means are rendered inactive by placing the strap 20 in a position of use, a subsequent sudden acceleration of strap 20 will cause the inertia member 30 to lock into cup member 36 and clutch spring 40 will turn ratchet wheel 75.

Figure 11:
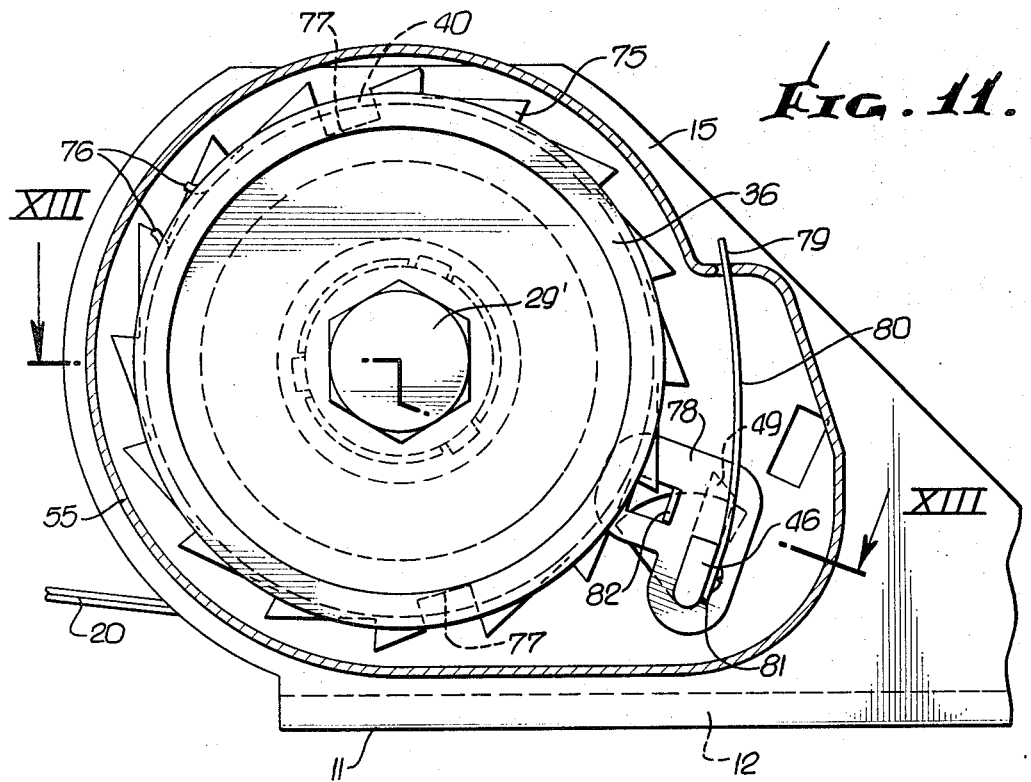
FIG. 11 is a view taken along lines XI—XI of FIG. 10.
Figure 12:
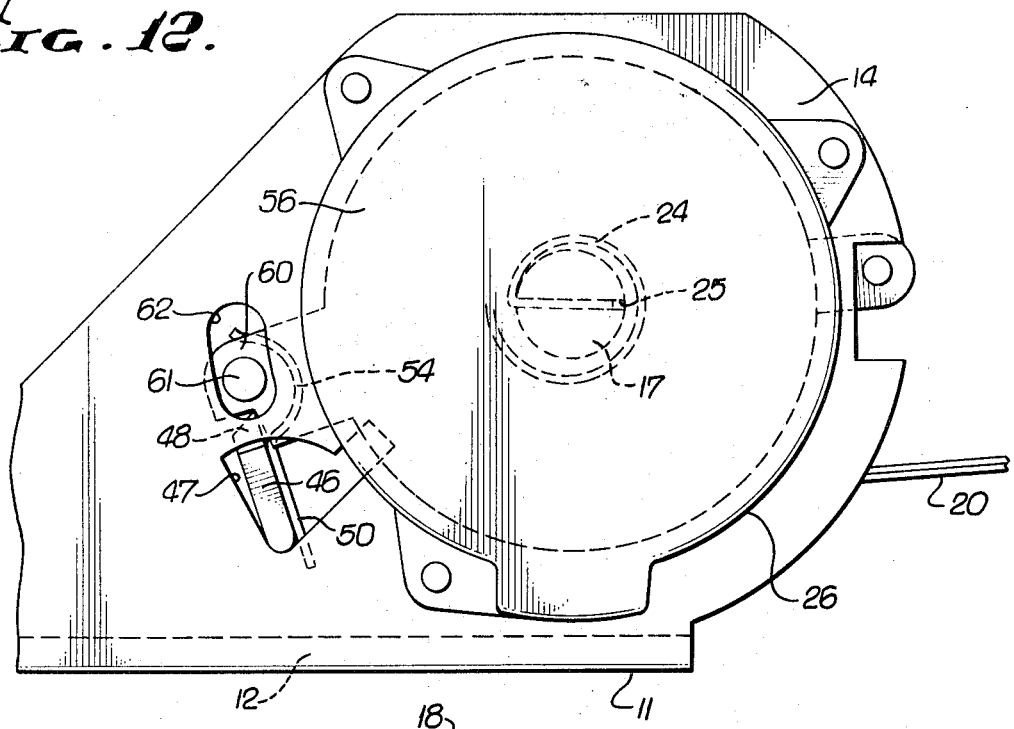
FIG. 12 is a view taken along lines XII—XII of FIG. 10 with parts thereof omitted for convenience of illustration.

Meanwhile, spring 80, normally biasing lockbar 46 into a locking position, is in the FIG. 11 position. This position corresponds to the first position of lockbar 46 in FIG. 7. As the webbing state sensing means (i.e., the second pawl blocking means 50 of FIG. 12) is deactivated as discussed hereinabove, lockbar 46, biased by spring 80, moves to the position shown in FIG. 14. This position corresponds to the second position of lockbar 46 in FIG. 8 (and is also shown in FIG. 12). Thus, lockbar 46 is now in an intermediate position to lock into ratchet wheel 75. After the third pawl blocking means (disc 56 of FIG. 12) is deactivated as discussed hereinabove, lockbar 46 and spring 80 are biased to move to the locked position shown in FIG. 15. However, locking tab 82 of dog 78 is in position to be engaged by ratchet wheel 75 (which is being rotated into locking engagement by clutch spring 40). This engagement turns lockbar 46 to the position of FIG. 15 and thus the pawls or teeth 48, 49 of lockbar 46 into positive locking engagement with the ratchet tooth gear 23 and guide flange 22 as set forth hereinabove.

It can be seen from the foregoing that the embodiment of FIGS. 10 through 15 eliminates the necessity for friction drive being applied by the clutch mechanism. The lockbar 46 is again biased into an intermediate position where the dog 78 is ready to be engaged by the ratchet wheel 75 as soon as it begins turning. At the same time, spring 80 normally biases lockbar 46 into locking position.

It can be seen from the foregoing that, an improved seat belt assembly or the like is described having novel means for permitting free pull of the strap from the assembly while the rolled-up condition of the strap or webbing on the reel of the assembly is being sensed. However, once the strap is locked up, the novel means of the invention is pre-set and biased to lock up immediately upon sudden acceleration of the strap or webbing. In this manner, a safer, more efficient seat belt assembly is provided.

We claim as our invention:

1. A safety belt device comprising:

a frame;

a shaft extending transversely of said frame and journalled for rotation therein;

a spool fixed for rotation on said shaft and having one end of a strap secured to said shaft and wound about said spool, the other end of said strap being adapted to be extended outwardly of said frame;

a rewind spring operatively connected to both said frame and said shaft;

at least one ratchet tooth gear mounted on said shaft and rotatable therewith;

a lock bar mounted on said frame and having at least one locking pawl thereon adapted to engage the teeth of said ratchet tooth gear, said lock bar being movable between positions engaging said teeth and out of engagement therewith;

inertia responsive means associated with both said frame and said lock bar for holding said lock bar in a position out of engagement with said ratchet tooth gear and responsive to sudden acceleration of said strap off of said spool for moving said pawl into locking engagement with said teeth;

strap state sensing means associated with said frame for sensing the rolled-up condition of said strap on said spool and holding said lock bar out of locking engagement with said gear until a predetermined amount of said strap is unrolled off of said spool;

blocking means associated with said frame for selectively holding said lock bar out of engagement with said gear while said strap is being unwound from said spool and releasing said lock bar for locking engagement with said gear when a predetermined amount of said strap is wound back onto said spool by said rewind spring; and lock bar biasing means associated with said frame normally biasing said lock bar into locking position with respect to said gear, said inertia responsive means including means thereon for selectively holding said lock bar against the bias of said lock bar biasing means and releasing said lock bar upon the actuation of said inertia responsive means when said sudden acceleration takes place, said inertia responsive means including an inertia member carried by one end portion of said shaft, said inertia member being turnable on an axis extending through its center of gravity, said axis being parallel to and eccentric from the axis of said shaft, a cup member rotatably carried by said shaft, said inertia member and said cup member having cooperating gripping portions, a calibration spring carried by said shaft and connected to said inertia member for normally holding the gripping portions of said inertia member and said cup member out of gripping engagement with each other, a split clutch spring yieldably gripping the exterior surface of said cup member with a predetermined pressure, a ratchet wheel rotatably mounted on said shaft, said clutch spring having a ratchet wheel rotation means thereon engaging said ratchet wheel for transmitting rotation of said clutch spring to said ratchet wheel, a dog fixedly secured to said lock bar, said dog having ratchet wheel teeth engaging means thereon adapted to engage the teeth of said ratchet wheel when said ratchet wheel is moved into locking engagement therewith, said inertia member being adapted, upon the acceleration of said strap outwardly from said frame beyond a predetermined rate determined by the force of said calibration spring, to turn against the tension thereof to thereby move said gripping portions into engagement to thereby rotate said cup member which rotates said clutch spring and thus rotates said ratchet wheel into locking engagement with said ratchet wheel teeth engaging means.

2. The device of claim 1 wherein said strap state sensing means includes a sensing member integrally connected at one end to said lock bar and having its other end bearing against the outer peripheral surface of said strap on said spool and normally biased in a direction toward the longitudinal axis of said shaft, said sensing member being integral with said lock bar biasing means.

3. The device of claim 1 wherein said blocking means includes a disc rotatably mounted on said shaft, said blocking means including means associated therewith for limiting the degree of rotation of said disc, said disc having a lock bar blocking cam thereon for holding said lock bar out of engagement with said gear, releasing means associated with said shaft for converting retraction of said shaft to movement of said disc in a direction releasing the blocking cam out of blocking engagement with said lock bar.

4. The device of claim 3 wherein said releasing means includes a flange member mounted on said shaft for rotation therewith, and spring means associated with said frame biasing said disc into frictional engagement with said flange so that retraction of said shaft and thereby said flange retracts said disc and thereby said blocking cam out of blocking engagement with said lock bar.

5. In a safety belt device having a frame, a shaft extending transversely of said frame and journalled for rotation therein, a spool fixed for rotation on said shaft and having one end of a strap secured to said shaft and wound about said spool, the other end of said strap being adapted to be extended outwardly of said frame, a rewind spring operatively connected to both said frame and said shaft, at least one ratchet tooth gear mounted on said shaft and rotatable therewith, a lock bar mounted on said frame and having at least one locking pawl thereon adapted to engage the teeth of said ratchet tooth gear, said lock bar being movable between positions engaging said teeth and out of engagement therewith, inertia responsive means associated with both said frame and said lock bar for holding said lock bar in a position out of engagement with said ratchet tooth gear and responsive to sudden acceleration of said strap off of said spool for moving said pawl into locking engagement with said teeth, strap state sensing means associated with said frame for sensing the rolled-up condition of said strap on said spool holding said lock bar out of locking engagement with said gear until a predetermined amount of said strap is unrolled off of said spool, blocking means associated with said frame for selectively holding said lock bar out of engagement with said gear while said strap is being unwound from said spool and releasing said lock bar for locking engagement with said gear when a predetermined amount of said strap is wound back onto said spool by said rewind spring and lock bar biasing means associated with said frame normally biasing said lock bar into locking position with respect to said gear, said inertia responsive means including means thereon for selectively holding said lock bar against the bias of said lock bar biasing means and releasing said lock bar upon the actuation of said inertia responsive means when said sudden acceleration takes place, the improvement which comprises:

said inertia responsive means includes an inertia member carried by one end portion of said shaft, said inertia member being turnable on an axis extending through its center of gravity, said axis being parallel to and eccentric from the axis of said shaft, a cup member rotatably carried by said shaft, said inertia member and said cup member having cooperating gripping portions, a calibration spring carried by said shaft and connected to said inertia member for normally holding the gripping portions of said inertia member and said cup member out of gripping engagement with each other, a split clutch spring yieldably gripping the exterior surface of said cup member with a predetermined pressure, a ratchet wheel rotatably mounted on said shaft, said clutch spring having a ratchet wheel rotation means thereon engaging said ratchet wheel for transmitting rotation of said clutch spring to said ratchet wheel, a dog fixedly secured to said lock bar, said dog having ratchet wheel teeth engaging means thereon adapted to engage the teeth of said ratchet wheel when said ratchet wheel is moved into locking engagement therewith, said inertia member being adapted, upon the acceleration of said strap outwardly from said frame beyond a predetermined rate determined by the force of said calibration spring, to turn against the tension thereof to thereby move said gripping portions into engagement to thereby rotate said cup member which rotates said clutch spring and thus rotates said ratchet wheel into locking engagement with said ratchet wheel teeth engaging means 6. In a safety belt device having a frame, a shaft extending transversely of said frame and journalled for rotation therein, a spool fixed for rotation on said shaft and having one end of a strap secured to said shaft and wound about said spool, the other end of said strap being adapted to be extended outwardly of said frame, a rewind spring operatively connected to both said frame and said shaft, at least one ratchet tooth gear mounted on said shaft and rotatable therewith, a lock bar mounted on said frame and having at least one locking pawl thereon adapted to engage the teeth of said ratchet tooth gear, said lock bar being movable between positions engaging said teeth and out of engagement therewith, inertia responsive means associated with both said frame and said lock bar for holding said lock bar in a position out of engagement with said ratchet tooth gear and responsive to sudden acceleration of said strap off of said spool for moving said pawl into locking engagement with said teeth, lock bar biasing means associated with said frame normally biasing said lock bar into locking position with respect to said gear, said inertia responsive means including means thereon for selectively holding said lock bar against the bias of said lock bar biasing means and releasing said lock bar upon the actuation of said inertia actuated means when said sudden acceleration takes place, the improvement which comprises:

said inertia responsive means includes an inertia member carried by one end portion of said shaft, said inertia member being turnable on an axis extending through its center of gravity, said axis being parallel to and eccentric from the axis of said shaft, a cup member rotatably carried by said shaft, said inertia member and said cup member having cooperating gripping portions, a calibration spring carried by said shaft and connected to said inertia member for normally holding the gripping portions of said inertia member and said cup member out of gripping engagement with each other, a split clutch spring yieldably gripping the exterior surface of said cup member with a predetermined pressure, a ratchet wheel rotatably mounted on said shaft, said clutch spring having a ratchet wheel rotation means thereon engaging said ratchet wheel for transmitting rotation of said clutch spring to said ratchet wheel, a dog fixedly secured to said lock bar, said dog having ratchet wheel teeth engaging means thereon adapted to engage the teeth of said ratchet wheel when said ratchet wheel is moved into locking engagement therewith, said inertia member being adapted upon the acceleration of said strap outwardly from said frame beyond a predetermined rate determined by the force of said calibration spring, to turn against the tension thereof to thereby move said gripping portions into engagement to thereby rotate said cup member which rotates said clutch spring and thus rotates said ratchet wheel into locking engagement with said ratchet wheel teeth engaging means.

* * * * *